UNITED STATES PATENT OFFICE.

THEODOR DIEHL, OF BERLIN, GERMANY, ASSIGNOR TO THE ACTIEN-GESELLSCHAFT FÜR ANILIN FABRIKATION, OF SAME PLACE.

BLUE-BLACK AZO DYE.

SPECIFICATION forming part of Letters Patent No. 491,410, dated February 7, 1893.

Application filed March 14, 1892. Serial No. 424,908. (Specimens.)

*To all whom it may concern:*

Be it known that I, THEODOR DIEHL, doctor of philosophy, residing at Berlin, in the Kingdom of Prussia, German Empire, have invented new and useful Improvements in the Production of Blue-Black Azo Dyes; and I do hereby declare that the following is a full, clear, and exact description of the invention, which will enable others skilled in the art to which it appertains to make and use the same.

The invention relates to the production of new azo-dyes derived from para amido-benzene-azoamido-alpha naphthaline. This base, the constitution of which is represented by the formula

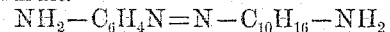

has been first described by Meldola (*Chem. Soc.* F. 43. 432) and was prepared by reducing with ammonium sulphide the nitroamidoazo compound obtained from diazotized para-nitraniline and alpha naphthylamine. Meldola converted this base into a tetrazocompound and combined the same with phenol, resorcine, alpha and beta naphtholmonosulpho acid Schäffer. The resulting products, which have not been examined in detail were either insoluble in water or did "not possess tinctorial power" (*Chem. Soc.* F. 43. 438.) The base has up to the present time not been practically used for the preparation of coloring matters. I have found, that contrary to the observation of Meldola the afore mentioned tetrazo compound yields not only a coloring matter when combined with Schäffer's acid, but that it may be employed for the production of new and valuable dyes, which result by its combination with certain sulpho acids of naphthol, naphthylamine or amidonaphthol.

The following examples will clearly show the manner of carrying out my invention.

I. 26.2 kilograms para-amidobenzine-azo-amido-alpha-naphthaline are diazotized in aqueous solution by means of sixty kilograms concentrated hydrochloric acid and fourteen kilograms nitrite of soda. The tetrazosalt thus obtained, which forms an orange red solution is combined in an alkaline solution with fifty kilograms gamma amidonaphtholsulpho acid (German Patent No. 53,076. United States Patent No. 458,285, dated August 25, 1891.) A blueblack precipitate is formed immediately; after standing for some time, the mixture is slightly heated up, the coloring matter—if necessary—salted out and then filtered, pressed and dried. The dyestuff forms an amorphous brown-black powder, which dissolves sparingly in cold, and easily in hot water with violet-black color; the addition of mineral acids or acetic acid to this solution produces a dark-blue precipitate. In hot alcohol the dyestuff is only sparingly soluble. Concentrated sulphuric acid dissolves the dyestuff with an indigo blue color; when this solution is diluted with water the free-acid of the dye-stuff separates in the form of blue black flakes. The dyestuff dyes unmordanted cotton in an alkaline or neutral bath containing some common salt or glauber's salt a bluish black; it may also be fixed on wool in a dyebath containing some salt and produces a black of great intensity. The color possesses a remarkable resistance against the action of light, air and soap.

II. If in the aforesaid example the gamma-amidonaphtholsulpho acid is replaced by forty-five kilograms alpha naphthol-alpha-monosulpho acid a dyestuff is obtained, which dyes slightly more violet-blue but which resembles in all its other properties the afore described product.

III. The tetrazo compound obtained as described in example I yields also a dyestuff when combined with naphthionic acid; in order to produce this color sixty-four kilograms of crystallized naphthionate of soda are combined with the tetrazocompound in a solution which contains an excess of acetate of soda. A black precipitate is formed in this way; after standing for about twelve hours the mixture is heated up, and neutralized with soda; the coloring matter is precipitated with salt, filtrated, pressed and dried. The shade of this dyestuff is still somewhat more violet blue, than that of the aforesaid products, which the color resembles moreover in its general behavior.

The dyes possess the general rational formula:—

$XN-NC_6H_4.N-N.C_{10}H_6.N-N.XX$, signifying one of the three acids mentioned hereinbefore.

Having now described my invention, what I claim is:

The blueblack dyes derived from the tetrazocompound of para-amido-benzine-azo-amido-alpha naphthaline and gamma amido-naphtholmonosulphoacid, beta naphthol-alpha monosulpho acid or naphthionic acid, said dyes being soluble in water, sparingly soluble in alcohol, turning blue in sulphuric acid, from which solution they are precipitated by water, substantially as set forth.

In testimony whereof I hereunto set my hand and affix my seal, in the presence of two witnesses, this 30th day of January, A. D. 1892.

THEODOR DIEHL. [L. S.]

Witnesses:
MAX HUF,
GUSTAV LUCHT.